United States Patent
Müller

(10) Patent No.: US 7,586,450 B2
(45) Date of Patent: Sep. 8, 2009

(54) DEVICE FOR TRANSMITTING AND/OR RECEIVING HIGH-FREQUENCY SIGNALS IN AN OPEN OR CLOSED SPACE SYSTEM

(75) Inventor: Roland Müller, Steinen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 11/792,408

(22) PCT Filed: Nov. 25, 2005

(86) PCT No.: PCT/EP2005/056222

§ 371 (c)(1),
(2), (4) Date: Jul. 7, 2008

(87) PCT Pub. No.: WO2006/061328

PCT Pub. Date: Jun. 15, 2006

(65) Prior Publication Data

US 2008/0272968 A1    Nov. 6, 2008

(30) Foreign Application Priority Data

Dec. 6, 2004    (DE) .................. 10 2004 058 862

(51) Int. Cl.
G01R 29/10    (2006.01)
(52) U.S. Cl. .................. 343/703; 343/878; 343/893; 342/124
(58) Field of Classification Search .......... 343/700 MS, 343/703, 878, 893; 73/290
See application file for complete search history.

(56) References Cited

U.S. PATENT DOCUMENTS

| | | | |
|---|---|---|---|
| 6,154,176 A | 11/2000 | Fathy | |
| 6,292,134 B1 | 9/2001 | Bondyopadhyay | |
| 6,323,809 B1 | 11/2001 | Maloney | |
| 6,629,458 B1 | 10/2003 | Westerling | |
| 6,684,697 B1 | 2/2004 | Westerling | |
| 7,046,189 B2* | 5/2006 | Spanke et al. ................ | 342/124 |
| 2004/0108951 A1 | 6/2004 | Edvardsson | |
| 2007/0029112 A1* | 2/2007 | Li et al. .......................... | 175/26 |
| 2007/0115196 A1* | 5/2007 | Motzer et al. ................ | 343/786 |
| 2008/0143583 A1* | 6/2008 | Welle et al. ................... | 342/124 |

FOREIGN PATENT DOCUMENTS

| | | |
|---|---|---|
| DE | 101 18 009 A1 | 10/2002 |
| EP | 1 083 413 A1 | 3/2001 |
| GB | 2 248 344 A | 4/1992 |
| WO | WO 02/09232 A1 | 1/2002 |

* cited by examiner

*Primary Examiner*—Tan Ho
(74) *Attorney, Agent, or Firm*—Bacon & Thomas, PLLC

(57) ABSTRACT

A device for transmitting and/or receiving high-frequency signals in an open or closed, spatial system, wherein the device is embodied as an array antenna, which transmits and receives high-frequency signals with a specified form of wavefront. The array antenna comprises a support structure with transmitting and/or receiving antenna elements. The support structure comprises a dielectric material, wherein a transmitting/receiving unit is provided, at least one feeding network is provided for transferring the high-frequency signals between the transmitting/receiving unit and the transmitting and/or receiving, antenna elements, and wherein a control/evaluation unit is provided. The device provides an inexpensive, compact and resistant device for transmitting and receiving high-frequency signals, which is distinguished by an optimized radiation characteristic.

20 Claims, 4 Drawing Sheets

DEVICE FOR TRANSMITTING AND/OR RECEIVING HIGH-FREQUENCY SIGNALS IN AN OPEN OR CLOSED SPACE SYSTEM

TECHICAL FIELD

The present invention relates to a device for transmitting and/or receiving high-frequency signals in an open or closed, spatial system, wherein the device is embodied as an array antenna, which transmits and receives the high-frequency signals with a specified, or predetermined, form of wavefront, wherein the array-type antenna is embodied as a support structure with transmitting and/or receiving antenna elements, wherein the support structure is made of a dielectric material, wherein a transmitting/receiving unit is provided, wherein at least one feeding network is provided for transferring high-frequency signals between the transmitting/receiving unit and the transmitting and/or receiving antenna elements, and wherein a control/evaluation unit is provided.

BACKGROUND DISCUSSION

One of many measuring methods for ascertaining fill level in a container is the travel-time measuring method. In the travel-time measuring method, for example, microwaves, or radar waves, are transmitted as measuring signals via an antenna apparatus, and the echo waves reflected on the surface of the medium are received back, following a distance-dependent travel time. From half of the travel time, the fill level of the medium in a container can then be calculated. The echo curve represents, in such case, received signal amplitude as a function of time, with each measured value of the echo curve corresponding to the amplitude of an echo signal reflected on a surface at a certain distance. The travel time measuring method is divided essentially into two detection methods, these being the time-difference measurement method, which ascertains the time needed for a broadband wave signal-pulse to travel over a path length, and the other, widely used detection method involving determination of the sweep frequency difference between the transmitted, frequency modulated, high frequency signal and the reflected, received, frequency modulated, high frequency signal (FMCW—Frequency-Modulated Continuous Wave).

In the following, no limitation is made to a specific detection method.

In process measurements technology, planar, array-type antennas have been used for a long time, since these, among other things, also radiate in special modes, e.g. the TE 01 mode. These modes have, for fill level measurements in containers, the advantage that they propagate almost uninfluenced by the container walls.

Such embodiments of planar antennas are disclosed in German patent application DE 101 18 009 A1 and European patent EP 1 083 413 B1.

A disadvantage of planar antennas is that they are most often oriented in a process measurement structure such that their planar surfaces are orthogonal to the gravitational field of the Earth, or, in other words, parallel to the surface of the fill substance. Given a temperature difference between the fill substance and the planar antenna, volatile constituents of the fill substance being measured condense on the planar antenna, and drops of the condensate form. This drop formation of the condensed fill substance changes the radiation characteristic of the antenna and measurements of fill level of a fill substance in a container are no longer correct. Since condensation of the evaporating fill substance, or medium, on the planar antenna can not be avoided, attempts have been made, based on structural measures, to overcome the adhesion forces, or surface tension, of the condensed medium on the material surface of the planar antenna. An embodiment of a planar antenna adapted in this way is described in U.S. Pat. No. 6,684,697, wherein the planar antenna is arranged tilted with respect to horizontal H by an angle a. By this tilted positioning, the force of gravity has also a force component parallel to the surface of the planar antenna, whereby the condensate, driven by this added force component, runs together to form larger drops, which then drop off at a given location. The change of the wavefront, or radiating direction, of the radiative lobe by the tilted position of the planar antenna is compensated by differing phase control for the antenna element rows. Additionally, disclosed in the U.S. Pat. No. 6,629,458 B1 is an embodiment of a planar antenna, in which, in front of the planar antenna, a filled cone is used as an antenna protective structure (radome). The filler is a dielectric, thermally insulating material, which has the same effect as described above, that the condensate can drop off of the surface of the antenna.

There are different types of planar antennas, which differ on the basis of their effects, embodiments and manufacture. For example, microstrip-patch-antennas have a series of notable advantages as regards small space requirement, simple manufacture, and low weight. A patch antenna is composed, in the simplest case, of a rectangular metal area (patch), which is mounted on a dielectric substrate above a conductive base. There is a multitude of possible shapes in use for special applications, including circular, elliptical, triangular and annular, patch radiators. The different forms serve, for example, for increasing bandwidth of the transmitted high frequency signals or for excitation of different modes.

The simplest kind of excitation occurs, for example, with the help of strip conductors, which are placed in the same plane as the patch-radiator antenna element. This kind of excitation has the advantage of simple and rapid manufacture. However, it has serious disadvantages, since the feeding network and the radiating antenna elements place very different requirements on the substrate material. For this reason, one-layer microstrip patch antennas with still acceptable radiative properties have only a small bandwidth. Help in this regard is provided by the use of multi-layer structural planes, where radiator and feeding network are arranged on different support structure layers, or substrate plies. The substrates, or support structures, for the feeding network and patch radiator antenna elements can then be optimally selected independently of one another. By this multilayer construction, however, an electrical connection between feeding network- and radiator-planes becomes necessary. One possibility is direct galvanic connection in the form of coaxial vias. Another, more elegant option is offered by antenna structures coupled via a coupling aperture. The coupling between feeding network and antenna elements occurs by narrow coupling apertures in the shared metallizing for grounding. On the basis of the slit coupling, the feeding network is completely shielded by the areal ground, which leads to very good radiative characteristics as regards side lobe levels, as well as cross polarization.

Embodiments of multi-layer, planar antennas of a glass ceramic are disclosed in U.S. Pat. No. 6,145,176 and in Published International Patent application WO 02/09232 A1. As also indicated in these documents, it is advantageous to build the multi-layer support structure on the basis of a glass ceramic which can be sintered at low temperatures (<1000° C.) (LTCC—Low Temperature Cofired Ceramics). This method, in which a plurality of thin layers of ceramic material in unfired state and structured metal structures are interfacially laminated together is very easily put into practice for a highly integrated building of a high frequency component. The planar, laminated, ceramic stack with the metal structures is fired at low temperatures, for providing its final strength.

SUMMARY OF THE INVENTION

An object of the invention is, therefore, to provide an inexpensive, compact and resistant device suitable for transmitting and receiving high frequency signals and distinguished by an optimized radiation characteristic.

This object is achieved according to a first embodiment of the invention by the features that the shape of the support structure in the direction of radiation of the array antenna deviates from a planar shape, and that the control/evaluation unit compensates for the deviations of the actual form of the wave front from the specified form of the wavefront, such as arise due to the form of the support structure with the transmitting and/or receiving antenna elements. The adapting of the wave front to a specified form is achieved by a targeted antenna operation, e.g. a targeted control and evaluation of phase position, frequency and/or amplitude of the measuring signals of the individual transmitting and/or receiving antenna elements by the control/evaluation unit. This electronic compensation of the wavefront of the measuring signals, or radiation characteristic, of the formed array antenna, in which the measuring signal delay of the individual antenna elements is back-calculated in the control/evaluation unit, requires an increased computing power in the control/evaluation unit and an increased processing power, or measuring performance, of the transmitting/receiving unit. In this type of compensation of the distortion of the wavefront, it is necessary to drive the transmitting and receiving antenna elements individually or in defined groups with the special measuring signal to be transmitted and/or to evaluate the reflected measuring signal, again, separately. A great advantage of electronic compensation of the wavefront of the measuring signal is, that almost any wavefront can be tuned-in with the array antenna, and this tuned wavefront can be changed or adjusted by relatively simple changing of the driving- and ascertainment-profiles of the individual transmitting and receiving antenna elements or their groups. An example of an embodiment of a three-dimensional patch antenna whose wavefront is achieved by driving the patches with measuring signals of different phase is disclosed in British patent application GB 2 248 344 A. Patch antennas fitted to the form and contour of the surroundings of a device, or integrated into a surface thereof, are referred to in the literature as conformal antennas.

A second solution of the posed object results from the features that the form of the support structure in the radiation direction of the array antenna deviates from planar form, and the the transmitting and/or receiving antenna elements and/or the feeding network for the individual transmitting or receiving antenna elements of the array antenna are structured and/or arranged on and/or in the support structure in such a manner that the deviations of the actual form of the wavefront from the specified form of the wavefront arising due to the form of the support structure are at least approximately compensated. Another type of opportunity for compensating for the changes in the wavefront due to the non-planar surface shape of the support structure with the transmitting and receiving antenna elements located thereon utilizes features that the structure, separation and/or size of the transmitting and receiving antenna act(s) on the transmitted and reflected measuring signal and permits production of the specified wavefront. Another opportunity involves adapting the feeding network that brings the measuring signal from the transmitting/receiving unit to the transmitting and/or receiving antenna elements of the array antenna and vice versa, in order to correct deviation of the wavefront from the specified form. The feeding network can be not only a network into which the high frequency signal is in-coupled at a central location, but also one involving direct contacting of individual transmitting/receiving units with the antenna elements, such as is used in the case of a "phase shift array" antenna. For example, by path-length differences in the feeding network and/or phase-shifting elements integrated into the feeding network, differences are produced in the phase position of the measuring signal in the individual antenna elements. This difference in the phase position of the measuring signal of the individual antenna elements compensates the error in the form of the wavefront and corrects the radiation characteristic of the array antenna, since neighboring wave points of the measuring signal with equal phase form a common wavefront. Thus, by a back-calculated HF-design of the transmitting and receiving antenna elements and their feeding network, an, in turn, optimized radiation characteristic can be produced as in the case of a planar array antenna.

An advantageous form of execution of the first and second embodiments of the solution of the invention is provided by the features that the support structure comprises a dielectric material which is formable at least in one of the processing steps of a manufacturing process for the array antenna. By the formable version of the array antenna during a manufacturing process step, the support structure can transformed in one piece into a certain form. However, it is to be heeded that, in the manufacturing of an array antenna with curvature, no residual stresses arise, which might lead to cracks in the material of the support structure and in the emplaced antenna element structures.

In an especially preferred form of embodiment of the first and second solutions of the invention, it is provided that the form of the support structure, which is made of the dielectric material, is brought about by planar segments which are assembled together. A further opportunity for producing a certain form of the array antenna is to divide the support structure into planar pieces having a certain fraction of the transmitting and receiving antenna elements and to affix these on a form element. On the form element are provided at least one connection line and/or at least one feed network for the transmitting/receiving unit, whereby the affixed, planar segments of the support structure are electrically contacted. The formed, or conformal, array antenna then has a facetted surface structure. The individual planar regions of the support structure of the array antenna can be smoothed to a specified form using a variable-thickness, protective layer, so that the surface of the array antenna assumes a uniformly curved form and the arising condensate can then run, and drop off, better.

A practical embodiment of the first and second solutions of the invention has the features that the dielectric material of the support structure is a ceramic, glass ceramic, organic material, a mixture of ceramic and organic materials, low temperature cofired ceramics (LTCC) or a Teflon-composite material. In selecting materials for the support structure, the transmitting and receiving antenna elements, the feeding network, the integrated transmitting/receiving unit and the control/evaluation unit, it is important that the coefficients of thermal expansion of the different materials of the multi-layer support structure be approximately equal. In selecting material for manufacturing an array antenna, it is necessary that the material be usable in the high frequency range, that the material be resistant to aggressive substances, and that the manufacture of the array antenna with the material be simply implementable.

An example of an embodiment involving selection of glass ceramics and metals, which have a minimal volume shrinkage during sintering and approximately equal coefficients of thermal expansion is provided in German patent DE 42 43 040 C2.

An advantageous form of embodiment of the first and second variants of the invention provides that the support structure of the dielectric material forms a cavity on the side of the array antenna facing away from the radiation direction. In this structure-effected cavity, accretions or condensates of the fill substance can form, but this introduction of material has hardly any effect on the radiation characteristic of the array antenna, since the emitting and receiving antenna elements are situated in front of this cavity, in the radiation direction toward the fill substance. An advantage is that electronics and further sensor equipment can be accommodated in this cavity.

In another advantageous form of embodiment of the two variants of the solution of the invention, it is provided that a fill material, or filler, is provided, which hermetically seals the cavity. Thus, in order that no condensate and no fill substance deposits in the cavity, the cavity can be hermetically sealed by a filler. By the hermetic sealing, the formed array antenna is mechanically stabilized and, additionally, the electronics and other sensor equipment in the cavity is protected from an aggressive process environment. The effect of the mechanical stabilizing of the support structure of the array antenna can be further increased by reinforcing elements placed in the cavity.

An advantageous embodiment of both variants of the solution of the invention provides that the support structure is embodied as a multi-layer support structure having a plurality of plies. The multi-layer embodiment of the support structure has the advantage that more complex, three-dimensional structures of the transmitting and receiving antenna elements, the feed network, the transmitting/receiving unit and the control/evaluation unit can be constructed. Furthermore, by the multi-layer embodiment of the support structure, the HF-characteristics of the material of each ply can be matched to the HF characteristics of the structures located thereon.

Another advantageous embodiment of the device of the first and second solutions of the invention provides that the transmitting and/or receiving antenna elements are arranged on and/or between at least one ply of the multi-layer support structure. Due to the multilayer embodiment of the support structure, the antenna elements can also be constructed via a plurality of layers, whereby the layers of the support structure are matched to the high-frequency technical properties of the respectively applied or embedded structures (e.g. antenna elements, feed network, electronics). By the multi-layer embodiment of the support structure, thus also more complex, three-dimensional structures can be implemented.

In an advantageous form of embodiment of the first and second variants of the solution of the invention, it is provided that a protective layer is provided, which is applied onto the support structure or onto the multi-layer support structure. This protective layer can be made of the same or similar material as the support structure. For example, when the antenna is built of a multi-layer glass ceramic, the protective layer applied over the transmitting and receiving antenna elements in the manufacturing process of the array antenna is a thin glass ceramic layer, which is optimized as regards HF-properties, such as e.g. attenuation of the HF-signal, temperature-stable value of the dielectric constant, and chemical properties, such as gas impermeability, chemical resistance.

A further advantageous form of embodiment of both solutions of the invention has features, that the array antenna is a strip-, slot-, loop- or patch-antenna, or a combination thereof, with corresponding transmitting and receiving antenna elements.

A variant of the two solutions of the invention provides that the support structure with the transmitting and/or receiving elements has at least one rise and/or at least one depression in the radiation direction of the array antenna.

A very advantageous variant of the two solutions of the invention provides that the depression and/or rise has at least a pyramid form, at least a tetrahedral form, at least a concave form, at least a convex form or at least a wedge form of the profile of the support structure. By providing the rises and depressions with geometric shapes, which have a tapering, protruding region, the condensate drops located on the surface are driven by the force of gravity and the normal force resulting therefrom to run together to form larger condensate drops. These protruding regions can be crafted in any number on the surface of the array antenna. Furthermore, a combination of various profiles, or geometric forms, can be provided on a support structure. The force equilibrium between the adhesion forces of the condensate drops and the acting gravitation is overcome, when the condensate drops become too heavy or the bearing surface on the surface is lessened by structural or chemical change (e.g. surface with lotus effect), whereby the condensate drops drop off the surface of the array antenna.

An advantageous form of embodiment of both variants of the invention provides that the support structure with the rise and/or depression has at least one tear-off edge or tear-off point, where the adhesive force of the running drops of condensate is overcome and the condensate drops off in the form of drops. This tear-off edge is most often dictated already by the geometric form of the support structure. For example, in the case of a support structure having cones or similar geometric shapes, there is no tear-off edge but, instead, a one-dimensional tear-off point.

An advantageous form of embodiment of both solutions of the invention provides that the closed spatial system is a container.

A very advantageous variant of the two devices of the invention provides that the transmitting and/or receiving antenna elements and the feeding network are made of a conductive material and/or a metal. In order that the high frequency signals, or electromagnetic waves, can be guided as waves on transmission lines, the antenna elements and the feeding network must be made of a conductive material. To this end, mostly structures of metal are applied; however, it is also possible to provide, for example, conductive regions in the ceramic, glass ceramic, by introducing certain conductive materials into these regions.

A further advantageous form of embodiment of the two devices of the invention provides that, the transmitting/receiving unit and/or the control/evaluation unit are/is placed in the cavity on the side of the support structure of the array antenna turned away from the radiation direction. By way of the shaping of the thin support structure, a cavity is formed on the side facing away from the fill substance. This cavity is used to integrate the HF-electronics of the transmitting/receiving unit into the structure of the array antenna. By filling the cavity with a fill material, the array antenna with integrated electronics is made pressure resistant and is sealed.

A supplementing embodiment of the two devices of the invention provides that the transmitting/receiving unit and/or the control/evaluation unit is integrated in a ply of the multi-layer support structure or on the support structure. If LTCC technology is used for building the array antenna, the transmitting/receiving unit and/or the control/evaluation unit can be embodied in plies of the multilayer support structure. This has the advantage that the connection lines between the individual electronic components can be kept short, and by the shorter paths, the high-frequency signal can be produced and forwarded with less loss.

A further advantageous form of the two devices of the invention provides that the feeding of the high-frequency signals from the transmitting/receiving unit into the feeding network and/or the transmitting and receiving antenna elements of the array antenna occurs via a coaxial line, or cable, or a hollow conductor, or waveguide. The electronics is most often placed outside of the process space, so that an electromagnetic connection is necessary between the electronics and the array antenna 1. This connection can occur via a coaxial line 27 or via a hollow conductor 29, wherein the high-frequency signal 14 is conveyed.

An advantageous form of embodiment of both solutions of the invention provides that the control/evaluation unit 23 ascertains the fill level 4 of a fill substance 5 in the open or closed spatial system 2 by means of measuring travel time between the transmitted and received, high-frequency signals 14. The device composed of the array antenna 1, the transmitting/receiving unit 25 and the control/evaluation unit 23 is used for ascertaining fill level 4 in a container 3. The device works according to the customary travel-time measuring method. The travel-time measuring method is basically divided into two methods of ascertainment, which are: Ascertaining the time difference required for a transmitted, high-frequency signal pulse to move over a path; and the further widely distributed ascertainment method involving determination of the frequency difference of the transmitted high-frequency signal 14,T, to the reflected, received, high-frequency signal 14,R (FMCW—frequency modulated continuous wave), wherein the frequency of the transmitted, high-frequency signal 14S is continuously changed.

BRIEF DESCRIPTION OF THE DRAWINGS

The invention and selected examples of embodiments will now be explained in greater detail on the basis of the appended drawings. For simplification, identical parts are provided in the drawings with equal reference characters. The figures show as follows.

DETAILED DISCUSSION

Figure 1:
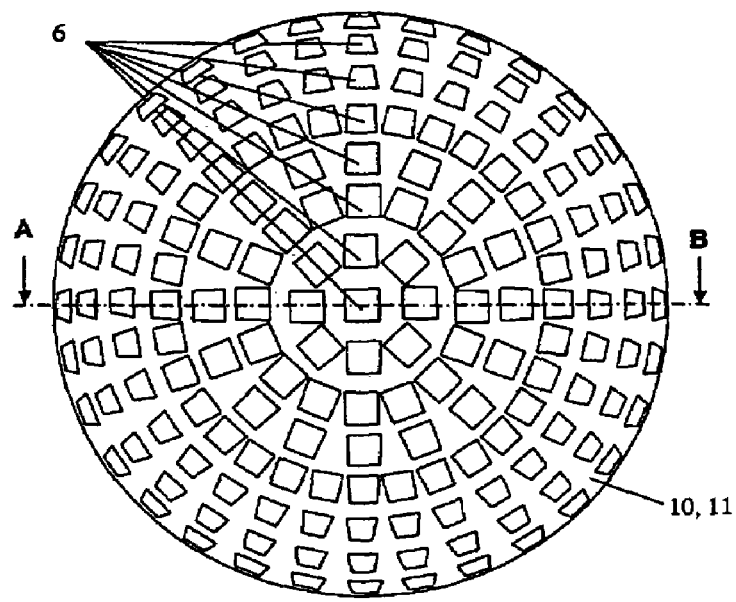
FIG. 1 a schematic, plan view of a first form of embodiment, which is a patch array antenna.

FIG. 1 shows an example of an embodiment of the array antenna 1 as a so-called patch array antenna having areal radiator elements. Antennas having a directed radiation characteristic 20, or directional effect, can be synthesized by an assembly of individual radiators, or individual antenna elements 6, to form an array or matrix. The areal radiator elements of the transmitting and receiving antenna elements 6 are arranged, for example, concentrically, or radially symmetrically. The change in the directional effect, or radiation characteristic 20, arising from the structure of the transmitting and receiving antenna elements 6 can be compensated for by the form of the array antenna 1, as shown in the sectional view of FIG. 2. The magnetic areal current densities in the coupling aperture layer 31 and antenna elements 6 is known, so that, with the help of the Green functions, the radiation characteristic of the far field of the array antenna can be ascertained. Changing the size of the areal radiator elements has an effect on the radiation characteristic 20 of the individual transmitting and receiving antenna elements 6 and has thus also, by the superposition of the individual radiation characteristics 19 of the individual antenna elements, an effect on the directional characteristic 20 an the wavefront 15 of the total array antenna 1 in the far field. The areal radiator elements have, for example, square areas, which appear trapezoidal in the view in FIG. 1 onto the hemispherical form of the array antenna 1. The protective layer 13 over the ply 12 bearing the transmitting and receiving antenna elements 6 is not shown in FIG. 1, in order to expose the structure therebeneath.

Figure 2:
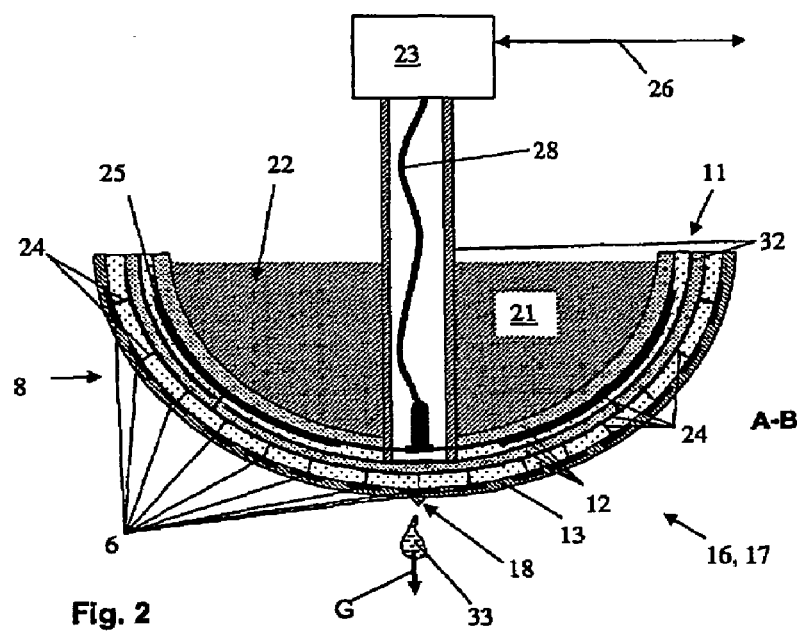
FIG. 2 a sectional view of the first form of embodiment taken on the cutting plane A-B of FIG. 1.

FIG. 2 shows a sectional view of the array antenna 1 of FIG. 1 taken along the cutting plane A-B. Integrated in the multilayer support structure 11 are the transmitting and receiving antenna elements 6, the feeding network 24 and the sending/receiving unit 25 in the particular plies of the multilayer support structure 11. The individual structures and antenna elements, which are emplaced onto the plies of the multilayer support structure 11, are electrically contacted through the plies by way of vias, which are formed in the manufacturing process into the plies 12. The materials of each ply 12 in the multilayer support structure 11 are matched to the high-frequency technical and mechanical properties of the introduced structures and antenna elements. Another option, which is not shown in FIG. 2, is implemented by aperture-coupled structures. The coupling, for example, between feeding network 24 and transmitting and receiving antenna elements occurs through narrow coupling apertures, which are formed in a coupling aperture layer 31 held at ground potential. Due to the slit coupling, the feeding network 24 is completely shielded by the grounded surface, this leading to very good radiation characteristics as regards side-lobe levels, as well as cross-polarization of the measuring signal.

The multilayer support structure 11 is formed as a bowl section of large radius, whereby the condensate 33, driven by the gravitational force G, runs off. For protection and for lessening adhesion forces of the condensate 33, a protective layer 13 is emplaced on the ply with the emitting and receiving antenna elements 6. This protective layer 13 can be modified in such a manner, for example with a hydrophobic outer surface, so that the contact angle of the condensate drops is as large as possible and the contact surface of the condensate drops 33 is lessened. By lessening the contact area of the condensate drop, also the adhesion force, which holds the condensate drops 33 on the surface, is made smaller. At the spatially referenced, deepest point of the protective layer 13, a tear-off edge or tear-off point, 18 is formed for the condensate drops 33, from where the drops running on the protective layer 13 drop off. Also other forms of support structure 10 can be implemented, such as e.g. conical, wedge, and wave forms, and, also, optionally, not just one, but a plurality of these can be emplaced. By the form of the thin support structure 10 or the multilayer support structure 11, there arises on the side of the array antenna 1 facing away from the radiation direction 19 a cavity 21, which, because of the formation of condensate drops 33 is hermetically sealed with a filler 22.

Via a connecting line 28, the transmitting/receiving unit 25 integrated into the multilayer support structure 11 communicates with the control/evaluation unit 23. This connecting line 28 extends, for example, through a potted, i.e. cast-in, tube serving also for securement of the array antenna 1 and as conductor for the electrical ground 32. The control/evaluation unit 23 is connected via a fieldbus 26 with a remotely located control location or other measuring devices 7. The measuring device 7 is also supplied with energy, or power, via this fieldbus 26 on the basis of two-conductor technology. Of course, a separate energy supply line can be provided, although this is not shown explicitly in FIG. 2.

Figure 3:
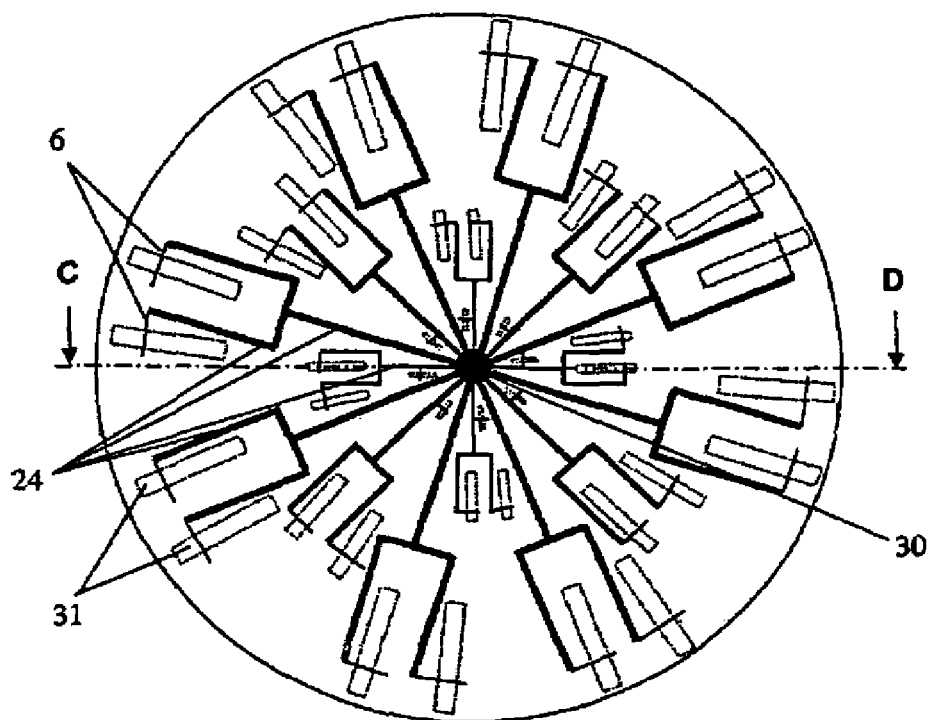
FIG. 3 a schematic, plan view of a second form of embodiment, which is a microstrip array antenna.

FIG. 3 shows an example of an embodiment of an array antenna 1 in the form of a microstrip antenna, or microstrip conductor antenna. The transmitting and receiving antenna elements 6 are arranged symmetrically and change in size from the inside to the outside. Due to the size change of the transmitting and receiving antenna elements 6, the form of the array antenna 1 and the changed radiation characteristic 20 associated therewith enable compensation of the wavefront 15 of the high frequency signal pulses 14 of the array antenna 1. The high frequency signals are forwarded, for example, via an in-coupling structure 30 and a feeding network 24 into the transmitting and receiving antenna elements 6. The high-frequency signal 14 is radiated from the transmitting antenna elements 6 into free space. Above the ply 12 with the transmitting and receiving antenna elements 6 is indicated another ply 12 as coupling aperture layer, or coupling aperture diaphragm 31. This coupling aperture diaphragm is most often made of a conductive material, or coated with a conductive material, and has openings where the transmitting and receiving antenna elements 6 are located in the lower ply 12. The protective layer 13 over the ply 12 bearing the transmitting and receiving antenna elements 6 is not shown in FIG. 1, in order to expose the structure therebehind.

Figure 4:
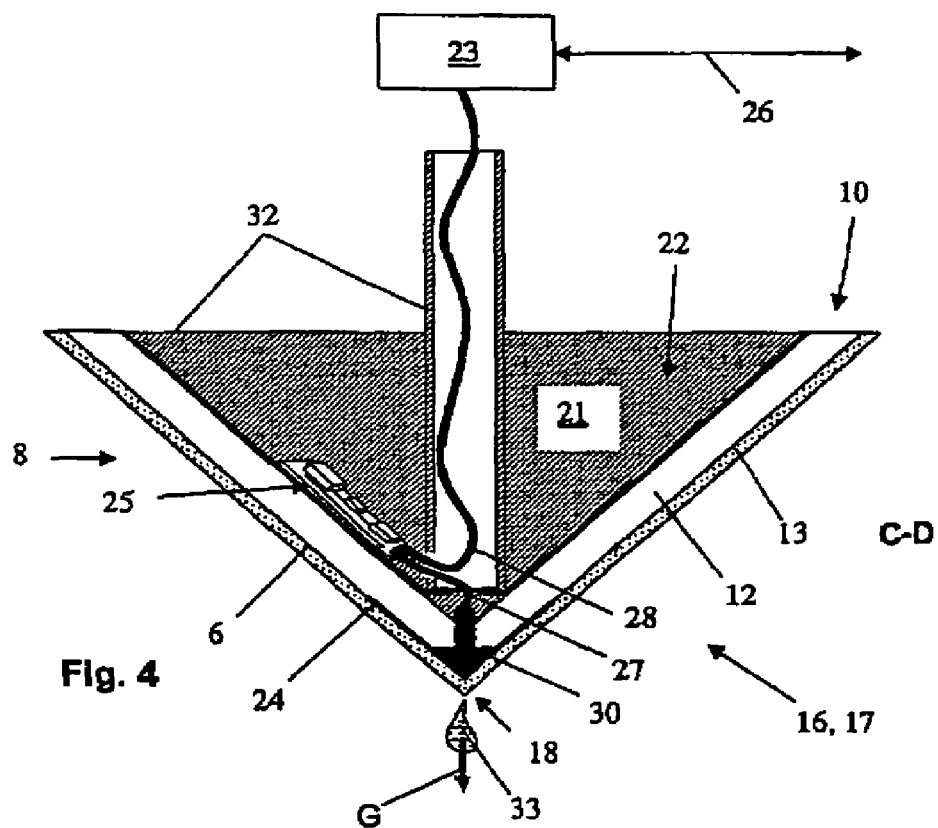
FIG. 4 a sectional view of the second form of embodiment taken on the cutting plane C-D of FIG. 3.

FIG. 4 shows one option for a sectional view of the array antenna 1 of FIG. 3 taken on the cutting plane C-D. The profile 8 of the array antenna 1 has a conical form. The transmitting and receiving antenna elements 6 are applied on the side of the support structure 10 facing the fill substance 5 and are fed with the high-frequency signal 14 via a feeding network 24. On the side of the support structure 10 facing away from the fill substance 5, an electrical ground layer 32 is applied, which has an electrical contact with the tube, in which the connecting line 28 extends. Applied over the transmitting and receiving antenna elements 6 is a protective layer 13, which protects the conducting structures from corrosion and accretion formation by the aggressive media, or fill substance, 5. In the transmitting/receiving unit 25, the high-frequency signal pulse 14 is produced, and the reflected high-frequency signal 14 is received back and preprocessed. This transmitting/receiving unit 25 is, in this form of embodiment, spatially separated from the control/evaluation unit 23 on a separate circuit board, which is hermetically sealed in the cavity 21 by the filler material 22 for protection. Via a connecting line 28, the transmitting/receiving unit 25 is connected with the control/evaluation unit 23, and, at the same time, with the feeding network 24 via a coaxial line 27 via an in-coupling structure 30. The connecting line is embodied in the case of an analog measurement signal transmission, for example, as a coaxial line 27. However, if the measurement signal 14 is already preprocessed and digitized in the transmitting/receiving unit 25, then a simple data line is sufficient. The in-coupling structure 30 is, in this embodiment, for example, a coaxial, plug connection. The control/evaluation unit 23 communicates via fieldbus 26 with a remote control room or other measuring devices 7.

Figure 5:
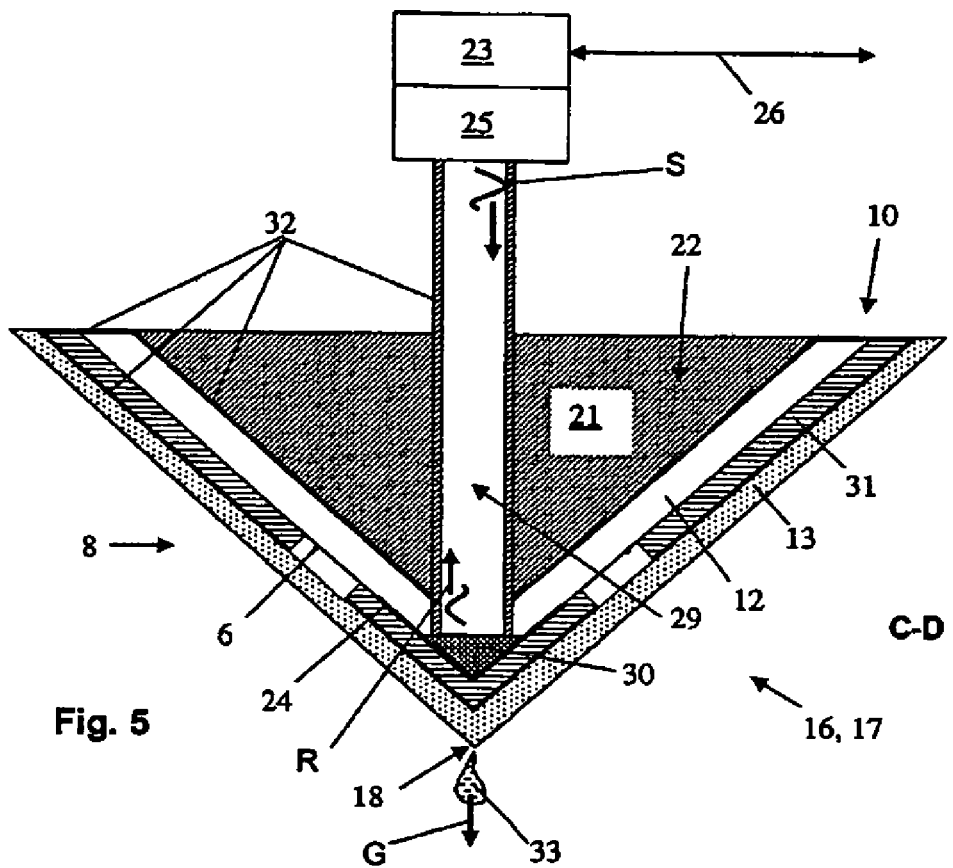
FIG. 5 a further sectional view of the second form of embodiment taken according to the cutting plane C-D of FIG. 3.

FIG. 5 shows another option for a sectional view of the array antenna 1 of FIG. 3 taken on the cutting plane C-D. The profile 8 of the array antenna 1 has, again, a conical form. The structure of the array antenna 1 has, however, at least two basic differences compared with the sectional view of the array antenna 1 in FIG. 4. The first difference is that the transmitting/receiving unit 25 is coupled directly to the control/evaluation unite 23 and that the high-frequency signal 14 is transmitted to an in-coupling structure by electromagnetic waves via a hollow conductor 29. And the second difference is that the transmitting and receiving antenna elements 6 are embodied as a conductor structure in a ply 12 of the support structure 10 and that, over this ply 12, a coupling aperture 31 of a conductive material or a conductive material coating is applied, having openings at the location of the transmitting and receiving antenna elements 6. These openings are so embodied that a high-frequency signal 14, or an electromagnetic wave, is radiated off with a certain mode and/or frequency, whereby the radiation characteristic 20 of the array antenna 1 can be changed and tuned also via the size of the openings of this coupling aperture layer 31. An array antenna 1 with such a coupling aperture layer 31 is known from EP 1 083 423 A1 and DE 101 08 993 A1.

Transfer of the measuring signal 14 from the transmitting/receiving unit 25, or the HF-electronics, and the feeding network 24 and the transmitting and receiving elements 6 is, as already mentioned above, enabled via electromagnetic waves, which are guided in a waveguide, or hollow conductor, 29. In the transmitting/receiving unit 25, in such case, the high-frequency signal pulse 14 is produced and radiated out via an exciter-pin in-coupling into the hollow conductor 29 as transmission pulse S. The hollow conductor 29 guides the high frequency signal pulse 14 up to a bi-directional in-coupling structure 30, which transforms the freely radiating, electromagnetic waves in free space into line-bound, electromagnetic waves, and forwards these to the feeding network 24. In the same manner, the reflection signal R, or the reflected high-frequency signal 14, is transmitted in the other direction.

Figure 6:
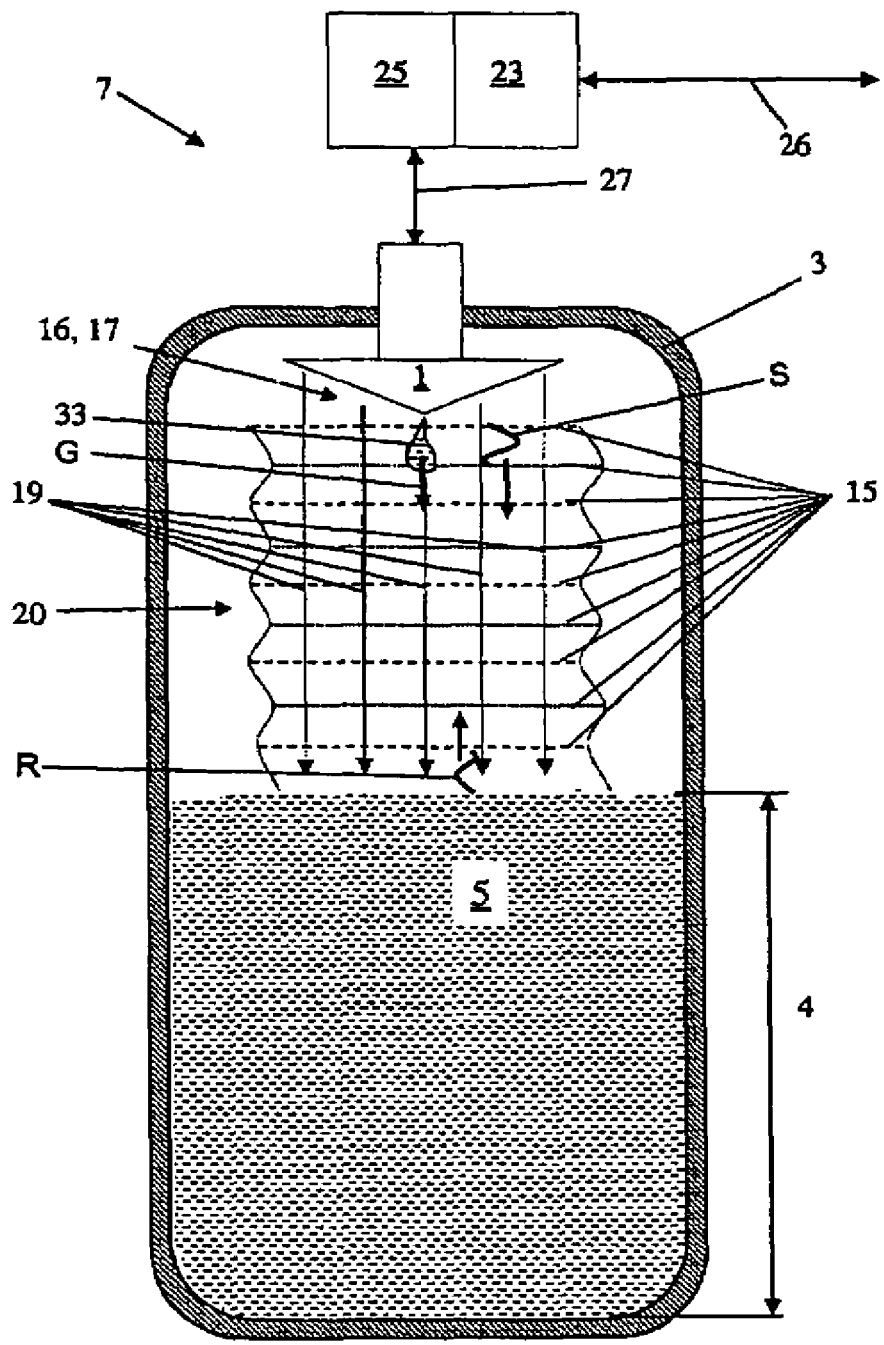
FIG. 6 a schematic, total view of a measuring device mounted on a container and equipped with an array antenna of the invention.

FIG. 6 shows a measuring device 7, which ascertains fill level 4 of a fill substance 5 in a container 3 according to the pulse travel-time measuring method. Measuring device 7 is mounted on the container 3, and the array antenna 1 with the transmitting and receiving antenna elements 6 is introduced through an opening into the measuring space of the container 5.

The pulse travel-time measuring method works according to the following measuring principle: Via the transmitting and receiving antenna elements 6 of the array antenna 1, high-frequency signal pulses 14, or a transmission pulse S, are transmitted. These propagate in the free space of the container 3, in the air or the protective gas, approximately with the speed of light. These high-frequency pulses 14 are partially or completely reflected back on materials, of higher dielectric constant value than air or the protective gas, located in the radiation cone of the array antenna 1. From the measured travel time of the transmitted high-frequency signal 14, or transmission pulse S, to the reflected high frequency signal 14, or reflection signal R, by a calculation involving the wave velocity formula, the traveled distance is ascertained. This difference distance corresponds to the height of the container 3 minus the fill level 4 of the fill substance 5 in the container 3. Since the height of the container 3, or the position of the in-coupling of the high-frequency signal 14, is known, the fill level 4 in the container 3 can be determined.

In the transmitting/receiving unit 25 of the measuring device 7, the high-frequency signal pulses 14 are produced and forwarded via the feeding network 24 and the coaxial line 27 to the corresponding transmitting antenna elements 6 in the support structure 10 of the array antenna 1. Transmitted high-frequency signals 14, which are reflected back, for example, on the surface of the fill substance 5, are guided from receiving antenna elements 6 of the array antenna 1 via the feeding structure 24 and the coaxial line to the transmitting/receiving unit 25, in which the received high-frequency signals are electronically preprocessed. The received high-frequency signals 14 are transformed in the transmitting/receiving unit 25 via a sampling method, or sequential sampling, with two high frequency pulse sequences slightly offset with respect to frequency, into a time-expanded, low-frequency, intermediate frequency signal. The reflected measurement signal 14, mixed down in this manner, can then be evaluated in the low frequency domain by the control/evaluation unit 23, and travel time, or travel distance, of the transmitting high-frequency signal 14 can be ascertained. The control/evaluation unit 23 has also the task of controlling communications with, for example, a remote control room or another measuring device via the fieldbus 26. The modification of the wavefront 15 and the radiation characteristic 20 brought about by the special form of the array antenna 1 can be electronically compensated, or corrected, by means of adjusting the phase positions of the high-frequency signals 14 of the transmitting antenna elements 6. This electronic compensation can be made to happen, on the one hand, by the transmitting/receiving unit 25, in which, for example, an electronic phase delay circuit is integrated. The electronic, phase delay circuit, which is controlled by the control/evaluation unit 23, produces phase differences in the high frequency signals 14 forwarded via the feeding network 24 and a coaxial line 27 to the corresponding, transmitting antenna elements 6. Since, for each phase position of the high-frequency signal 14, a single feeding network 24 and coaxial cable 27 is necessary, it is advantageous, as shown, for example, in FIGS. 2 and 4, to integrate the transmitting/receiving unit in the support structure 10 or in the cavity 21 of the array antenna 1, in order to save on wiring effort, or coaxial cables 27. The electronic phase delay circuit can, for example in a measurement setup, be tuned by the control/evaluation unit 23 via the fieldbus 26, with the radiation characteristic 20, or directional effect, of the array antenna 1 being ascertained, a structure profile of the phase delay calculated, and the structure profile stored in a memory unit of the control/evaluation unit 23. In the measurement setup, for example, the error from the specified radiation characteristic 19 or the specified wavefront 15 of the formed array antenna 1 is ascertained, and, in this way, the phase correction values of the different transmitting and receiving antenna elements 6 determined and stored. Another option is not to integrate the transmitting/receiving unit 25 itself into the support structure 10 or the cavity 21, but, instead, only the electronic phase delay circuit, which receives from the transmitting/receiving unit 25 over a coaxial cable 27 the phase-equal, high-frequency signal 14. The electronic compensation of the phase position can, on the other hand, also be done by a back-calculating of the individual measuring signals 14 of the antenna elements 6 in the control/evaluation unit 23. To this end, the measuring signals 14 of the individual antenna elements 6 are compared with one another and, on the basis therefor, corrected in phase position relative to one another. This technique of electronic compensation of the wavefront or radiation characteristic requires a high computer power and therefore also requires more time than the other compensation methods.

By the special form of the array antenna, depressions and/or rises 16 are provided in the geometric form of the array antenna 1, whereby at least one region 17 projecting toward the fill substance occurs. By the gravitational force G, which acts on the condensate drops 33, such run together on the projecting regions and can then, there at a tear-off edge or a tear-off point 18, overcome the adhesion forces holding them and so then drop off of the surface.

Figure 7:
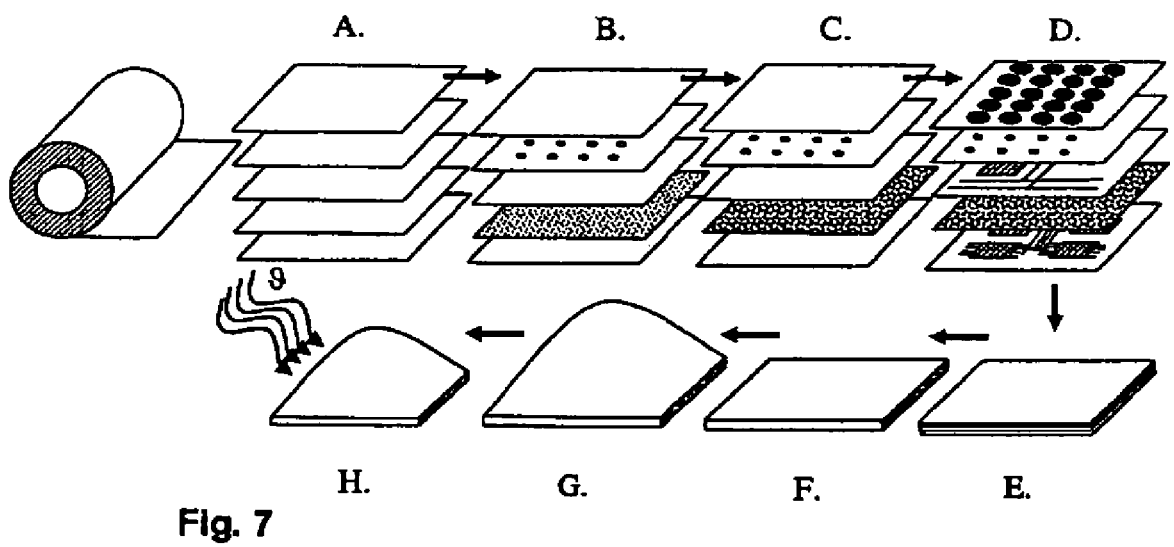
FIG. 7 an LTCC process for manufacturing an array antenna of the invention.

FIG. 7 shows the process steps for manufacturing an array antenna 1 with a non-planar support structure in LTCC (low temperature cofired ceramics) technology. The process sequence can be roughly subdivided into the following steps:

A. Preparing: The tape produced by slip casting on carrier band is drawn as starting material. For further processing, it is rolled off and cut in a blanking process into coupons. For avoiding shrinkage in the drying processes necessary in the following, the tape coupons are thermally treated.

B. Stamping: For through-contacting (vias), cavities, coupling apertures and positioning holes, the coupons are stamped with a tool or machined out with a laser (e.g. a YAG-laser). For alignment of the different process steps relative to one another, registration bores are introduced. Finally, the carrier band is removed.

C. Filling: The so-obtained bores for through-contacts (vias) are filled with conductive-trace paste using stencil or screen printing and special vacuum technology, in order, following sintering, to obtain conductive connections between the individual plies of the tape. Before the next step, the paste is dried in an oven.

D. Screen printing: Conductive traces, resistors and capacitors are produced by a screen printing method using corresponding pastes on the surfaces. For structures with small resolution, a photo-structurable paste can be applied, which enables structuring photolithographically. Also here, the applied material must be dried after each printing or manufacturing procedure.

E. Stacking, Binding: The individual plies prepared in this manner must then be stacked together with proper orientations. This is effected by the insertion of locating pins into the previously fabricated positioning holes, or registration bores. The plies are bound together by pointwise heating or drops of solvent, in order to maintain registration until lamination.

F. Lamination: In a laminating press (uniaxial or isostatic), the plies are intimately bonded together by pressure (circa 3000 psi) and temperature (circa 80° C.). The organic binders in the tapes play the main role in such case.

G. Thermal, isostatic pressing: In an isostatic press, the laminated plies are pressed under pressure and temperature into the desired form. Special aids and press-forming tools enable that the stack of plies assumes the desired form and that cavities, conductive traces and other provided structural features are not deformed. This method step can also be performed in conjunction with the previous, laminating method step, but then special attention must be given that the individual plies are not shifted relative to one another by the forming.

H. Firing and sintering: Using a temperature-time curve suited for the materials, first, in a sintering oven, at circa 400-500° C., the organic components of the tapes and pastes are driven out. Thereon follows the glass-forming process, or sintering, of the composite to glass ceramic at circa 880-900° C. By using glass ceramic composites that have only slight volume shrinkage, the formed support structure can be sintered in the press-forming tool, whereby a higher form-trueness of the formed array antenna can be assured.

For improving stability of the formed material and for minimizing the effect of any residual stresses in the material from the forming, individual plies 12 can be integrated into the stack sequence of the multilayer support structure 11 that have a certain structuring. By the structuring of the material, e.g. as honeycomb structures, circle structures, and polygonal structures, reinforcements are introduced into the stack sequence of the multilayer support structure 11 for its stabilization. Moreover, stresses, which can arise in the material from the forming, are compensated and neutralized by the structured plies 12.

The invention claimed is:

1. A device for transmitting and/or receiving high-frequency signals in an open or closed, spatial system; comprising:
an array antenna, which transmits and receives the high-frequency signals with a specified form of wavefront, said array antenna includes a support structure with transmitting and/or receiving antenna elements, said support structure comprises a dielectric material;
a transmitting/receiving unit;
at least one feeding network for transferring the high-frequency signals between said transmitting/receiving unit and said transmitting and/or receiving antenna elements; and
at least one control/evaluation unit whereine:
said support structure in a radiation direction of said array antenna deviates from planar form; and
said control/evaluation unit compensates for deviations of actual form of the wavefront from the specified form of the wavefront, such as arise due to the form of said support structure with said transmitting and/or receiving antenna elements.

2. The device as claimed in claim 1, wherein:
said support structure comprises a dielectric material which is formable in at least one of the method steps of a manufacturing process of the array antenna.

3. The device as claimed in claim 1, wherein:
form of said support structure of the dielectric material is obtained from assembled, planar portions.

4. The device as claimed in claim 1, wherein:
said dielectric material of said support structure comprises a ceramic with organic materials, low temperature cofired ceramics (LTCC), or a Teflon composite material.

5. The device as claimed in claim 1, wherein:
said support structure of said dielectric material provides a cavity on a side of said array antenna facing away from its radiation direction.

6. The device as claimed in claim 5, wherein:
said transmitting/receiving unit and/or said control/evaluation unit is provided in said cavity on the side of said support structure of said array antenna facing away from the radiation direction.

7. The device as claimed in claim 5, further comprising a filler, which hermetically seals said cavity.

8. The device as claimed in claim 1, wherein:
said support structure is embodied as a multilayer support structure having a plurality of plies.

9. The device as claimed in claim 8, wherein:
said transmitting and/or receiving antenna elements are arranged on and/or between at least one ply of said multilayer support structure.

10. The device as claimed in claim 8, wherein:
said transmitting/receiving unit and/or said control/evaluation unit is integrated in a ply of said multilayer support structure or on said support structure.

11. The device as claimed in claim 1, further comprising:
a protective layer, which is applied to said support structure or said multilayer support structure.

12. The device as claimed in claim 1, wherein:
said array antenna comprises a strip-conductor-, slot-, loop-, logarithmic-spiral-, or patch-antenna, or a combination thereof, with corresponding transmitting and receiving antenna elements (6).

13. The device as claimed in claim 12, wherein:
said support structure with transmitting and/or receiving antenna elements has at least one rise and/or at least one depression in the radiation direction of said array antenna.

14. The device as claimed in claim 13, wherein:
the depression and/or rise comprises at least one conical shape, at least one pyramid shape, at least one tetrahedral shape, at least one concave shape, at least one convex shape or at least one wedge shape of a profile of said support structure.

15. The device as claimed in claim 14, said support structure with the rise and/or the depression has at least one tear-off edge or tear-off point.

16. The device as claimed in claim 1, wherein:
said closed spatial system comprises a container.

17. The device as claimed in claim 1, wherein:
said transmitting and/or receiving antenna elements and/or said feeding network comprise a conductive material and/or a metal.

18. The device as claimed in claim 1, wherein:
the feeding of the high-frequency signal from said transmitting/receiving unit into said feeding network and/or into said transmitting and receiving antenna elements of said array antenna occurs via a coaxial cable or a hollow conductor.

19. The device as claimed in claim 1, wherein:
said control/evaluation unit ascertains fill level of a fill substance in the open or closed spatial system by means of a travel-time measuring method comparing the transmitted to received, high-frequency signals.

20. A device for transmitting and/or receiving high-frequency signals in an open or closed, spatial system; comprising:
an array antenna, which transmits and receives the high-frequency signals with a specified form of wavefront, said array antenna includes a support structure with transmitting and/or receiving antenna elements, said support structure comprises a dielectric material;
a transmitting/receiving unit
at least one feeding network for transferring the high-frequency signals between said transmitting/receiving unit and said transmitting and/or receiving antenna elements; and
at least one control/evaluation unit, wherein:
said support structure in a radiation direction of said array antenna deviates from planar form; and
said transmitting and/or receiving antenna elements and/or said feeding network for said individual transmitting or receiving antenna elements of the array antenna are structured and/or arranged on and/or in said support structure in a manner such that the deviations of actual form of the wavefront from the specified form of the wavefront, such as arise due to the form of said support structure, are at least approximately compensated.

* * * * *